J. E. MARSH.
APPARATUS FOR RECOVERING PARTICLES OF FISH MEAT FROM LIQUIDS.
APPLICATION FILED MAY 5, 1913.
1,124,774.
Patented Jan. 12, 1915.
2 SHEETS—SHEET 1.
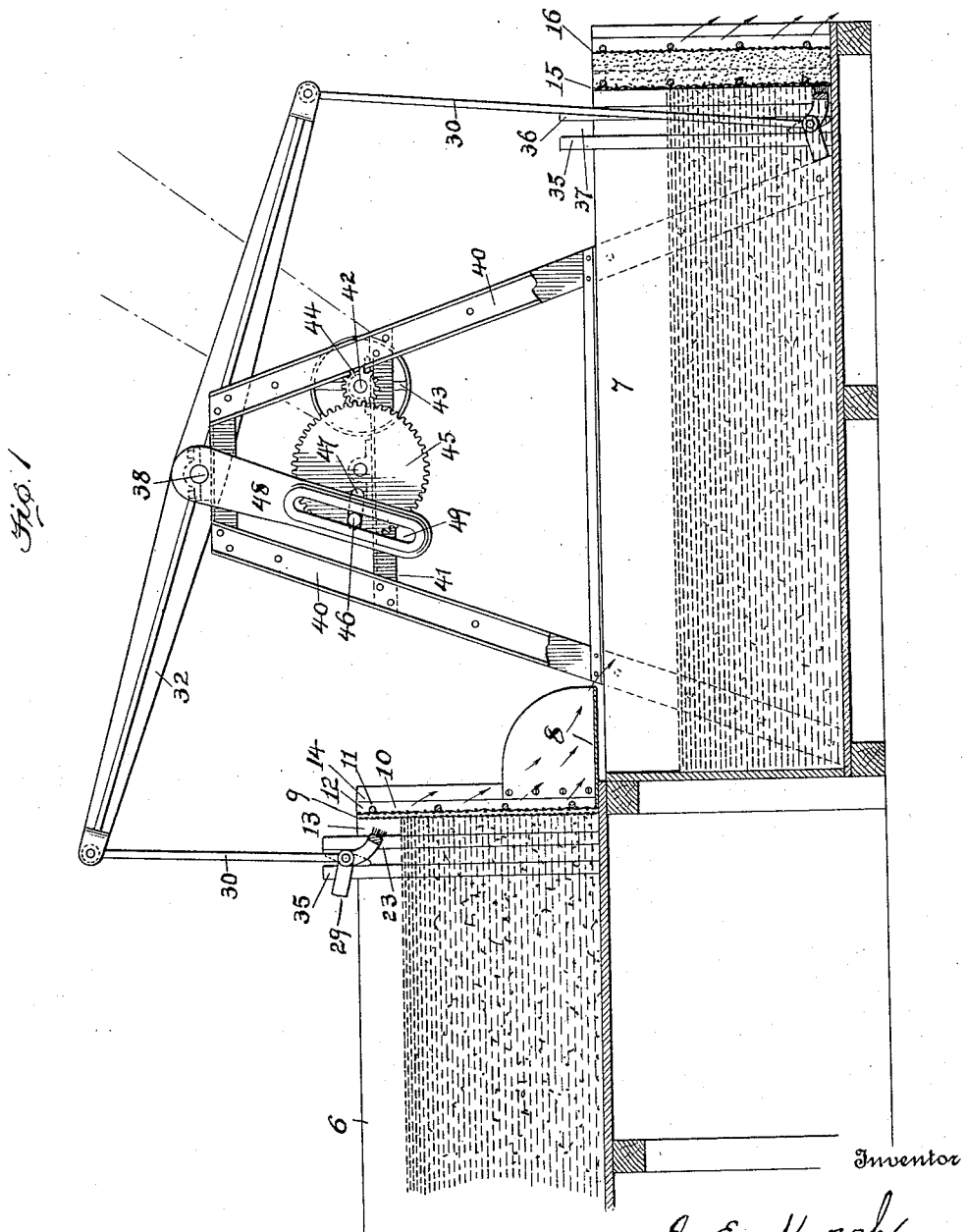

J. E. MARSH.
APPARATUS FOR RECOVERING PARTICLES OF FISH MEAT FROM LIQUIDS.
APPLICATION FILED MAY 5, 1913.
1,124,774.
Patented Jan. 12, 1915.
2 SHEETS—SHEET 2
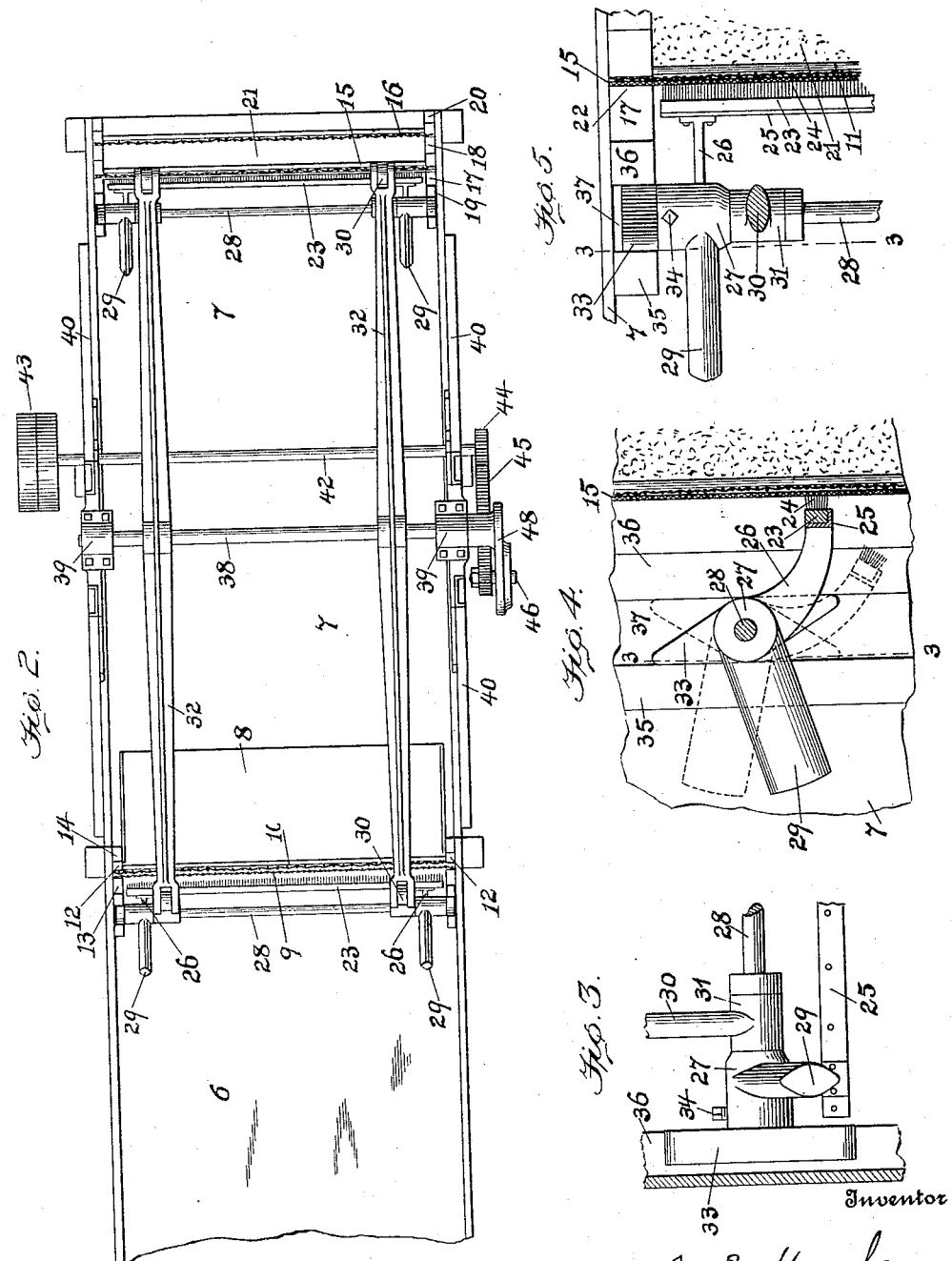
Witnesses
Edwin L. Bradford
G. Ferd. Vogt
Inventor
J. E. Marsh
By Mann & Co.
Attorneys

UNITED STATES PATENT OFFICE.

JAMES E. MARSH, OF REEDVILLE, VIRGINIA.

APPARATUS FOR RECOVERING PARTICLES OF FISH-MEAT FROM LIQUIDS.

1,124,774.                  Specification of Letters Patent.      Patented Jan. 12, 1915.

Application filed May 5, 1913.   Serial No. 765,591.

*To all whom it may concern:*

Be it known that I, JAMES E. MARSH, a citizen of the United States, residing at Reedville, in the county of Northumberland and State of Virginia, have invented certain new and useful Improvements in Apparatus for Recovering Particles of Fish-Meat from Liquids, of which the following is a specification.

This invention relates to an apparatus designed to effect a separation of insoluble particles of fish meat from water, or from an admixture of water and oil and thereby effect a saving of the meat.

In the Menhaden fishery business the fish are taken by huge nets in large quantities, then the fish are cooked and afterward subjected to compression to express the water and oil from the meat. A large part of the oil is taken care of and saved by various methods of procedure, but in the present practice considerable loss of valuable fish meat arises by small particles of the meat being carried off in the water that is expressed from the fish.

The object of this invention is to provide mechanical means to save from loss these small particles of fish, as it has been found that in the extensive conduct of this business this loss in a season's operation is very considerable.

The invention is illustrated in the accompanying drawing, in which, Figure 1 is an elevation of the apparatus in which some of the parts are shown in vertical section. Fig. 2 is a plan view of the apparatus. Fig. 3 is a vertical section on the line 3—3 of Figs. 4 and 5, looking from the left-hand side toward the right. Fig. 4 is a vertical elevation of the parts shown in top plan view in Fig. 5 omitting the rod 30 and its eye 31. Fig. 5 is a top plan view of the parts seen in Figs. 3 and 4.

The apparatus includes two open-top water tanks, 6, 7, one placed higher than the other and arranged so that the liquid in the higher one will flow into the lower one; the water flows over a suitable chute or guideboard, 8, from the upper tank and drips into the lower tank. Both the upper and lower tanks are provided at their discharge ends with vertical screens through which the water passes; each screen is fixed to a rectangular frame so as to permit of ready removal. The screen of the upper tank is made preferably of two woven wire sheets, the first sheet, 9, next to the body of water being fine mesh, and the second sheet, 10, a coarse mesh to reinforce and give strength to the finer. On the exterior of the coarse mesh sheet are cross-bars, 11, to stay both sheets and enable them to resist the pressure of the water in the tank. The woven wire sheets, 9, 10, and cross-bars, 11, are secured in a frame, 12, which sets freely between two vertical bars, 13, 14, fixed to the side of the upper tank, 6. This construction permits the screen to be raised and entirely removed, either for cleaning or repair.

The screen of the lower tank, 7, is similar but somewhat modified; in this case two screenes, 15, and, 16, are employed, each being attached to a separate frame, 17, and, 18, and both frames setting freely between two vertical bars, 19, 20. The two screens, 15, 16, are spaced apart, and the space is filled with suitable granulated filter material, 21. A sheet of cloth or wire fabric, 22, may rest against the first screen, 15, and serve as a strainer.

In order to keep the inner surfaces of the screens at the discharge ends of the tanks clear of fish meat so as to allow the water to pass through said screens, I provide a brush 23, for each screen and I also provide means whereby each brush is given a vertical reciprocation at the inner side of the screen it is to clean. I also provide means whereby during the downward movement, the brush is swung toward and into brushing contact with the screen surface but on its upward movement is swung away from the screen surface and free of contact therewith. Therefore by means of devices now to be described the brush will wipe over the screen each time it descends but will swing out of wiping contact on each upward stroke. The purpose of this operation is to brush the particles downward only so as to cause them to settle at the bottom of the tank.

As the construction of the brush operating devices is the same for both tanks, a description of one will apply to both.

A metal angle bar 25, extends horizontally across the tank at the inner side of the screen and said bar is carried by two arms 26, each of which latter has a hub-shaped head 27. Each head 27, has a prong or metal body 29, projecting from one side thereof which serve as counterweights so as to counterbalance the angle bar 25, as will presently appear. A rod 28, also extends horizontally across the tank and its ends enter and are rigidly connected to the hub-shaped heads 27, by means of set screws 34. It will thus be seen that the two heads 27, and rod 28, are therefore rigidly connected. The horizontal rod 28, is sustained loosely in eyes 31, which latter are provided on the lower ends of pendant rods 30, whose upper ends are pivotally connected to rocking arms 32. In the present instance two rocking arms 32, are employed and each arm carries a pendant rod 30, with an eye 31, at its lower end so that one eye will loosely sustain one end of bar 28, while the other eye will loosely sustain the other end of said bar 28. A wooden bar 23, is attached to the angle bar 25, and also extends horizontally across the tank at the inner side of the screen and this wooden bar is provided with bristles 24, which form a horizontal brush,—the bristles projecting from the wooden bar toward the screen they are to clean. It will thus be understood that the bar 28, hub-heads 27, angle bar 25, wood bar 23, and weights 29, are all rigid with respect to each other, but that as bar 28, is pivotally carried in eyes 31, all said parts may rock with respect to the eyes. It will also be noted that the arms 26; angle bar 25, and wood bar 23, extend forwardly toward the screen while the prongs or weights 29, project rearwardly from bar 28, and serve to counterbalance the bars 25 and 23.

By reference to Fig. 3 of the drawings it will be seen that the counterbalance weight prongs 29, are of an elliptical shape and are relatively sharp at their upper and lower sides so as to cut the water and offer little resistance when moved up or down through the fluid in the tank.

By referring to Figs. 3, 4 and 5 of the drawings it will be seen that the rod 28, has a block 33, at each end thereof which blocks are rigidly connected to the rod so as to move up and down therewith and also to rock as the rod is rocked in the eyes 31. These blocks 33, have flat opposite vertical faces but have a diamond-shaped edge-outline, being tapered at the upper and lower ends and broadest across the center where they are connected to rod 28. From the foregoing explanation it will be seen that the blocks 33, will rock with the heads 27, weights 29, and bars 23 and 25.

The inner vertical side wall of each tank has a vertical channel or guideway 37, formed in the present instance by spaced-apart vertical strips 35 and 36, and the two diamond-shaped blocks 33,—one at each end of rod 28, have position in these guideways 37. The width of these guideways is sufficient to allow the broad central portions of the blocks 33, to freely enter therein with the pointed ends of the blocks projecting above and below the rod 28, as clearly shown in Figs. 3 and 4 of the drawings.

The rocking arms 32 are supported on a rock-shaft, 38, which fits in bearings, 39, on the top of a horse-frame, 40, consisting of two upright angle-iron standards at each longitudinal side of the apparatus. Below the top bearings is a horizontal bar, 41, which connects the two upright standards. A drive-shaft, 42, extends horizontally across the machine and turns in bearings that rest on the said bar, 41; at one end the drive shaft has pulleys, 43, and a drive-belt may run over these pulleys to impart power and motion. At the other end of the drive-shaft, 42, is a pinion, 44, that meshes with a gear wheel, 45, that carries a crank-pin, 46. This crank-pin is adjustable in a radial slot, 47, formed in the gear wheel, 45, to permit the position of the pin to be changed. The rock-shaft, 38, has an arm, 48, rigidly fixed thereto; this arm extends downward and a slot, 49, is formed in the arm. The crank-pin, 46, projects in the said slot, 49.

In the operation of the apparatus, presuming the tanks to contain the fluids and meat particles expressed from fish during the extraction of the oil, the blocks 33, at the ends of rod 28, will have position in the vertical guideways. When rock arms 32, move downwardly, they depress pendant rods 30, which latter will push rod 28, down through the fluid in the tank. During this downward movement rod 28, will be guided by means of the blocks 33, in the guideways. The brush bar 23, being practically balanced with respect to the eyes 31, because of the counterweights 29, will readily swing from its point of suspension. The direction of this swinging motion of the brush bar depends upon the application of pressure to the lower side of the brush bar or to the application of pressure to the upper side of that bar. When, therefore, the brush bar, which extends horizontally across the tank, is forced downwardly through the watery fluid in the tank, obviously pressure will be applied to the under side of the bar, because of the resistance of the fluid against that bar as the latter is forced down. This application of pressure on the under side of horizontal bars 25, and 23, caused by the resistance of the fluid on the bars throughout their length, overcomes the balance that is practically maintained when the device is at rest, and causes the brush bar to swing forwardly and upwardly, as shown in full lines in Fig. 4, of the drawing and by such movement bring the brush bristles 24, against the inner surface of the screen. In order to limit this forward swinging movement of the brush, I use the diamond-shaped blocks 33, and guideway 37. By tapering the upper and lower ends of blocks 33, said ends may rock back and forth, with rod 28, as the pivot, until one side or the other of an end strikes the vertical wall of the guideway. As the blocks 33, brush and counterweights all rock together, the brush can only swing so far as the tapered ends of the blocks will permit. By referring to Fig. 4, it will be seen that the upper end of the block 33, has one side edge in contact with the vertical wall of strip 35, while the lower end of the same block has the opposite edge in contact with the vertical wall of strip 36, and while this condition prevails, which is during the downward stroke of the rods 30, the brush 24, will be in contact with the screen 15, to wipe the latter during such downward stroke. During this downward stroke the counterweights 29, because of their tapered upper and lower edges, will afford very little counteracting resistance against bars 25 and 23, and the result is that brush 24, will swing toward and wipe the screen. When the upward stroke takes place, because of the change of motion of arms 32, the brush bar 23, will have to again displace the fluid with the result that the pressure will then be applied to the upper side of bar 23. This pressure on the upper side of bar 23, therefore causes said bar to swing down and in doing so rocks bar 28, and shifts blocks 33, so that they will assume the position shown in broken lines in Fig. 4, of the drawing. In this instance the upper end of the block will have one side edge in contact with strip 36, while the lower end will have one side edge in contact with guide strip 35, which prevents the practically counterbalanced brush and weights from turning completely over. It will thus be seen that on each downward stroke the brush swings into engagement with the screen while on each upward stroke said brush will swing away from the screen.

By providing the rock bar 32, and tank arrangement shown in Fig. 1, of the drawing a brush for each tank screen may be operated,—one making an upward stroke while the other makes a downward stroke and both screens thereby be kept clear of meat particles that would otherwise choke up the screen and prevent the escape of the fluid from the tanks.

Having thus described my invention what I claim and desire to secure by Letters Patent is:—

1. The combination with a tank having an outlet, of a screen at said tank-outlet; stationary guide devices at opposite sides of the outlet; a brush at one side of the screen and guided by said guide devices; means for reciprocating the brush with respect to the screen; means for pivotally sustaining the brush with respect to the reciprocating means to permit it to rock toward and from the screen and means for limiting the rocking movement of the brush.

2. The combination with a tank having an outlet, of a screen at said tank-outlet; stationary guide devices at opposite sides of the outlet; a horizontal brush at one side of the screen and having its ends guided by said guide devices; means for moving the brush up and down adjacent to the screen; means for pivotally sustaining the brush with respect to the up and down moving means to permit it to rock independently of the latter as it starts its downward and its upward movement through the fluid and means for limiting the rocking movement of the brush.

3. The combination with a tank having an outlet, of a screen at said tank-outlet; stationary guide devices at opposite sides of the tank; a horizontal brush at one side of the screen; rocking means for carrying the brush; vertically reciprocating means depending into the tank and pivotally sustaining the rocking means and means rigid and moving vertically with the rocking means and engaging the guide devices to limit the rocking movement of the brush.

4. The combination with a tank having an outlet, of a screen at said tank-outlet; stationary guide devices at opposite sides of the tank; a horizontal brush at one side of the screen; reciprocating bars depending into the tank; rocking means carried by the depending bars for sustaining the horizontal brush and devices movable with the rocking means for engaging the guide devices said movable devices also moving with the reciprocating bars and limiting the rocking movement of the rocking means and brush.

5. The combination with a tank having an outlet, of a screen at said tank-outlet; stationary guide devices at opposite sides of the tank; vertically reciprocating bars depending into the tank; a horizontal rod carried by the lower ends of said bars; heads on said horizontal rod and each head having a weight at one side and a brush-carrying means at the opposite side; a horizontal brush sustained by the carrying means on the heads and means moving with the heads for engaging the guide devices to guide the brush with respect to the screen.

6. The combination with a tank having an outlet, of a screen at said tank-outlet; stationary guide devices at opposite sides of the tank; reciprocating bars depending into the tank; a rod extending horizontally across the tank and carried by the lower ends of the reciprocating bars; heads on the rod and each head having a weight at one side; brush-carrying means projecting from the other side of the heads and counterbalanced by said weights; a horizontal brush sustained by said carrying means and movable with the heads and a block at the side of a head to engage the guide device.

7. The combination with an upper tank having a screened outlet, of a lower tank to receive the discharge from said upper tank and said lower tank also having a screened outlet; rock arms above the tanks; depending means carried by one end of said arms and depending into one tank; depending means carried by the other end of said arms and depending into the other tank; a brush in each tank adjacent to the screened outlet thereof; means for pivotally sustaining the brush in one tank from one of said depending means and means for pivotally sustaining the brush in the other tank from the other depending means.

In testimony whereof I affix my signature in presence of two witnesses.

JAMES E. MARSH.

Witnesses:
GEO. W. BUSSELLE,
R. M. SHERMAN.

Copies of this patent may be obtained for five cents each, by addressing the "Commissioner of Patents, Washington, D. C."